US008490822B1

(12) United States Patent
Griffin

(10) Patent No.: US 8,490,822 B1
(45) Date of Patent: Jul. 23, 2013

(54) COMBINATION DRINK DISPENSER

(76) Inventor: Jason Griffin, San Diego, CA (US)

( * ) Notice: Subject to any disclaimer, the term of this patent is extended or adjusted under 35 U.S.C. 154(b) by 46 days.

(21) Appl. No.: 13/014,644

(22) Filed: Jan. 26, 2011

Related U.S. Application Data

(63) Continuation-in-part of application No. 11/604,041, filed on Nov. 24, 2006, now Pat. No. 7,896,189.

(51) Int. Cl.
*B01F 11/00* (2006.01)

(52) U.S. Cl.
USPC ........ 220/568; 220/23.83; 220/676; 206/219; 366/130

(58) Field of Classification Search
USPC ......... 220/568, 676, 23.83; 206/219; 366/130
See application file for complete search history.

(56) References Cited

U.S. PATENT DOCUMENTS

| | | | | | |
|---|---|---|---|---|---|
| 53,965 | A | * | 4/1866 | Fisler | 366/130 |
| 288,775 | A | * | 11/1883 | Cherry | 220/568 |
| 300,867 | A | * | 6/1884 | Hauck | 220/568 |
| 950,288 | A | * | 2/1910 | Heinrichs | 220/568 |
| 1,042,751 | A | * | 10/1912 | Barker | 220/568 |
| 1,054,833 | A | * | 3/1913 | Dutton | 220/568 |
| 1,056,882 | A | * | 3/1913 | Bonn | 215/386 |
| 1,141,207 | A | * | 6/1915 | Parent | 210/469 |
| 1,765,129 | A | * | 6/1930 | Cooke | 220/568 |
| 2,090,320 | A | * | 8/1937 | Amick | 215/12.1 |
| 2,330,012 | A | * | 9/1943 | Schlumbohm | 210/464 |
| 2,433,248 | A | * | 12/1947 | Sweier, Jr. | 366/147 |
| 2,752,971 | A | * | 7/1956 | Tupper | 220/4.03 |
| 2,776,691 | A | * | 1/1957 | Tupper | 220/256.1 |
| 3,327,911 | A | * | 6/1967 | Candito | 222/572 |
| 3,347,385 | A | * | 10/1967 | Russell | 210/232 |
| 3,820,692 | A | * | 6/1974 | Swett et al. | 222/547 |
| 4,003,555 | A | * | 1/1977 | Swartz | 366/130 |
| 4,806,241 | A | * | 2/1989 | Holien | 210/248 |
| 5,275,307 | A | * | 1/1994 | Freese | 222/42 |
| 5,388,729 | A | * | 2/1995 | Gerringer | 222/130 |
| 5,419,429 | A | * | 5/1995 | Zimmerman et al. | 206/222 |
| 5,575,618 | A | * | 11/1996 | Brandon et al. | 415/121.2 |
| 6,224,253 | B1 | * | 5/2001 | Dixon | 366/247 |
| D503,304 | S | * | 3/2005 | Fiedeler et al. | D7/300.1 |
| 6,913,165 | B2 | * | 7/2005 | Linz et al. | 220/568 |
| 7,225,920 | B2 | * | 6/2007 | Hoeffkes et al. | 206/222 |
| D604,984 | S | * | 12/2009 | Kalamaras | D7/300.1 |
| 7,896,189 | B2 | * | 3/2011 | Griffin | 220/568 |
| 2003/0214140 | A1 | * | 11/2003 | Lynd | 294/27.1 |
| 2005/0279698 | A1 | * | 12/2005 | Kleinman | 210/470 |
| 2006/0255035 | A1 | * | 11/2006 | Lin | 220/212 |

* cited by examiner

*Primary Examiner* — Anthony Stashick
*Assistant Examiner* — Christopher McKinley
(74) *Attorney, Agent, or Firm* — QuickPatents; Kevin Prince

(57) ABSTRACT

A combination beverage mixer and strainer is disclosed, comprising a first container and a second container, each container having a closed end, an open end, a peripheral wall defining an interior space therein. The area of each open end is greater than the area of each closed end. The first container includes a straining edge of the peripheral wall proximate the periphery of the open end and having a plurality of apertures traversing therethrough. The area of the open end of the second container is greater than the area of the closed end thereof but smaller than the area of the open end of the first container. The open end of the second container may be inserted fully into the open end of the first container such that the peripheral wall of the second container contacts the peripheral wall of the first container below the straining edge so that the internal spaces of each container are sealed and the contents of the containers shaken and mixed. The open end of the second container may then be partially pulled away from the first container to expose the straining edge of the first container, such that the internal spaces of each container are unsealed at the plurality of apertures and the contents of the containers may be strained thereby.

15 Claims, 3 Drawing Sheets

COMBINATION DRINK DISPENSER

CROSS-REFERENCE TO RELATED APPLICATIONS

This application is a continuation-in-part of U.S. patent application Ser. No. 11/604,041, filed on Nov. 24, 2006, and incorporated herein by reference.

STATEMENT REGARDING FEDERALLY SPONSORED RESEARCH AND DEVELOPMENT

Not Applicable.

FIELD OF THE INVENTION

The present invention relates in general to multipurpose vessels and more specifically to a combination drink dispenser capable of enabling shaking and straining flowable materials in an easy, quick, and efficient manner.

DISCUSSION OF RELATED ART

Most of the mixed drinks require the inherent use of a shaker to properly make them. People may be seen at home or commercial places using shakers to prepare such drinks. Conventional shakers generally comprises two container, such that one container covers the hollow space of the other container thereby creating an arrangement that may be used for making shake drink. Usually the hollow space between the two containers receives liquids and/or solids, such as ice, fruit, herb, and the like, to be mixed. After shaking the drink material inside the shaker, the drink needs to be strained out generally with the help of separate strainer which may be time consuming and inefficient at times. There are some shakers available with strainer or filter arrangement which may be selectively closed during mixing and opened upon the completion of mixing to permit the mixed drink to be poured from the container, without spilling the ingredients intended to remain back in the container. But such types of strainers are complex, expensive and need efficient hands to operate. Attempts have been made to address this problem.

U.S. Pat. No. 5,419,429 discloses a mixing and drinking beaker with an adhesive, closing and sealing system between the cover and the beaker and with a chamber in the cover consisting of an outer cover and an inner cover therein after the adhesive and sealing system. The inner cover can be released from its seat without releasing the joint between the cover and the beaker without the need for any additional mechanism simply by the yielding of sealing seat of the material surrounding the inner cover by pressure from outside axially to the outer cover on the handle and/or the surrounding area of the outer cover. In addition, the adhesive bond between the cover and the beaker can be changed to a positive bond by a shrink strip. The above approach is limited to shaking and cannot perform the function of filtering.

U.S. Pat. No. 6,913,165 discloses a cocktail shaker which has a head adapted for releasably sealing an insulated container, having at least one plastic wall, where the container may be used as a drinking vessel. The cocktail shaker head has a metal selectively closeable strainer or filter portion and an integral reinforcement body portion carrying a flexible sealing gasket which has multiple ribs for releasably sealing the shaker top onto the container. The container has double insulating walls including a standoff within the walls spacing the walls apart, and a smooth metallic lip seal joining the walls together to create a smooth lip on the container, and which is adapted to receive the shaker top sealing gasket. The plastic and metal portions of the shaker head and container have shoulder stepped connections for securing the respective plastic and metal parts together. The cocktail shaker of the above approach is complex, expensive and will need good maintenance.

Accordingly, there remains a need for a multipurpose drink dispenser capable of enabling shaking and straining of flowable materials in an easy, quick, inexpensive, and efficient manner at home as well as in commercial places. The present invention accomplishes these objectives.

SUMMARY OF THE INVENTION

In view of the foregoing disadvantages inherent in the prior art, the general purpose of the present invention is to provide a combination drink dispenser configured to include all the advantages of the prior art, and to overcome the drawbacks inherent therein.

In an aspect, the present invention provides a combination drink dispenser. The combination drink dispenser comprises a first container and a second container detachably positionable on the first container. The first container and the second container configure an arrangement enabling shaking and straining of a flowable material.

In another aspect, the present invention provides a combination drink dispenser, comprising a first container and a second container. The first container having a first closed end portion, a second open end portion, a curved body or peripheral wall extending from the first closed end portion to the second open end portion, the curved body configuring an interior space therein, a periphery of the second open end portion greater than a periphery of the first closed end portion, and a straining edge of the peripheral wall of the first container proximate a peripheral edge or periphery of the open end of the first container.

The second container has a first closed end portion, a second open end portion, and a curved body or peripheral wall extending from the first closed end portion to the second open end portion, the curved body configuring an interior space therein, a periphery of the second open end portion greater than a periphery of the first closed end portion. The second container is detachably positionable on the first container in a manner, such that, the first container and the second container configures an arrangement enabling shaking and straining of a flowable material.

Other features and advantages of the present invention will become apparent from the following more detailed description, taken in conjunction with the accompanying drawings, which illustrate, by way of example, the principles of the invention.

DESCRIPTION OF THE DRAWINGS

The advantages and features of the present invention will become better understood with reference to the following more detailed description and claims taken in conjunction with the accompanying drawings, wherein like elements are identified with like symbols, and in which:

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The exemplary embodiments described herein detail for illustrative purposes are subject to many variations in structure and design. It should be emphasized, however, that the present invention is not limited to a particular shaker vessel, as shown and described. It is understood that various omissions, substitutions of equivalents are contemplated as circumstances may suggest or render expedient, but is intended to cover the application or implementation without departing from the spirit or scope of the claims of the present invention.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present invention provides a multipurpose combination drink dispenser that has functionality of both a shaker and as a strainer. The combination drink dispenser configures an arrangement that may be used for making drinks, such as, but not limited to mock tail, cocktail, martini and the like. The combination drink dispenser of the present invention provides an easy, quick, and efficient way of making such drinks at home as well as in commercial places. The combination drink dispenser may be mass produced inexpensively with different shape, size and color. The material used for manufacturing the multipurpose shaker vessel may include plastic, steel, aluminum, and the like.

Figure 1:
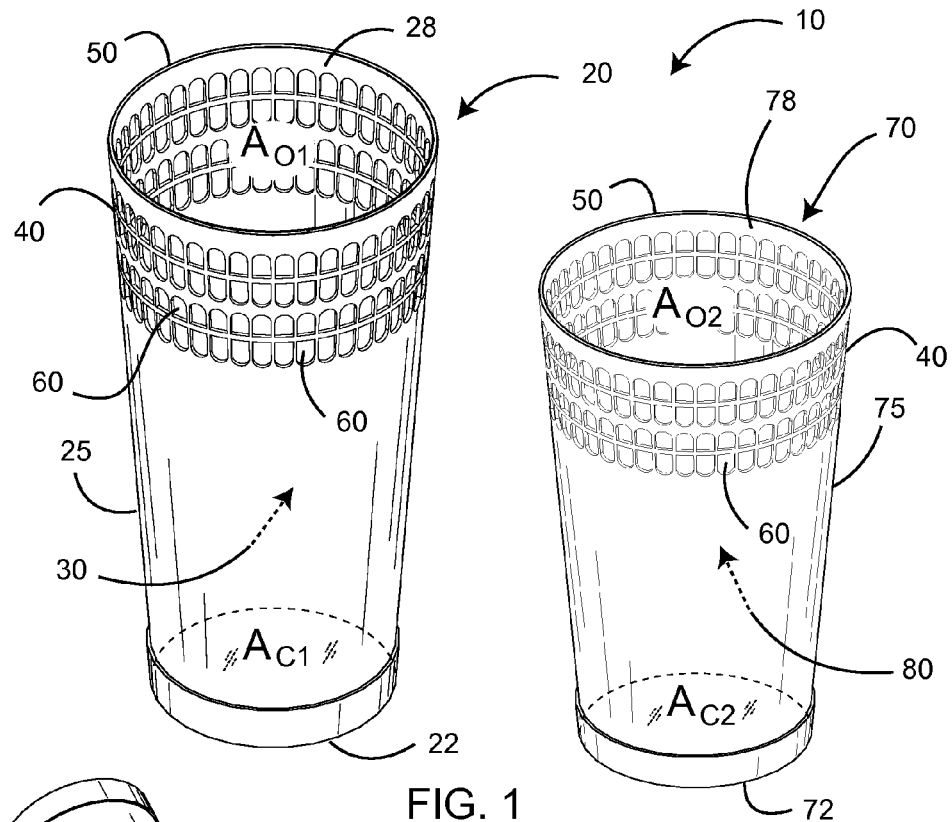
FIG. 1 is a perspective view of one embodiment of a first and second container of the present invention.
Figure 2:
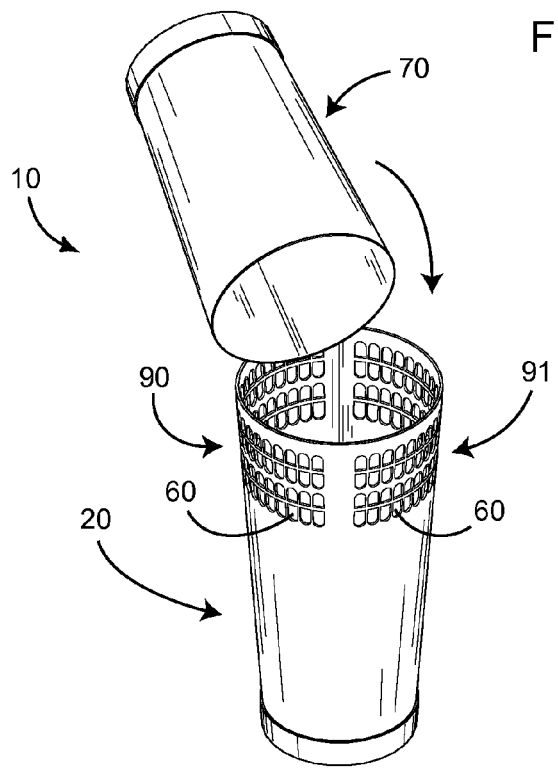
FIG. 2 is a perspective view of the first and second container, illustrating that an open end of the second container fits into an open end of the first container.
Figure 3:
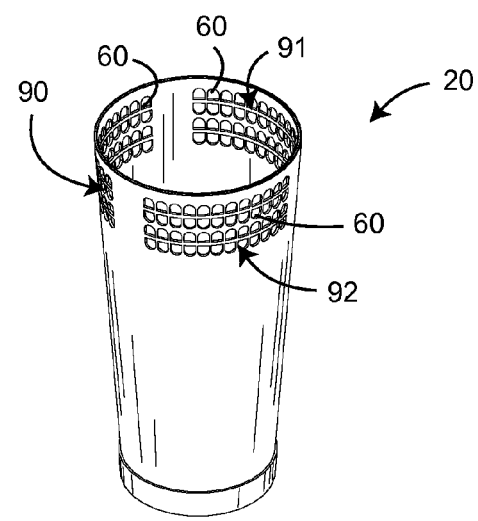
FIG. 3 is a perspective view of another embodiment of the first container.
Figure 4:
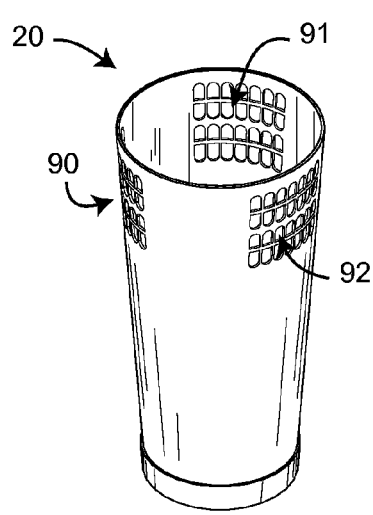
FIG. 4 is a perspective view of an alternate embodiment of the first container.

FIGS. 1 and 2 illustrate a combination 10 of a beverage mixer and strainer. A first container 20 has a closed end 22, an open end 28, and a peripheral wall 25 extending from the closed end 22 to the open end 28 that defines an interior space 30 therein. The area $A_{o1}$ of the open end 28 is greater than the area $A_{C1}$ of the closed end 22. Such a first container 10 is preferably made from a stainless steel material, or other suitably rigid, durable, and washable material. Such a container 20 is also preferably integrally formed.

The first container 20 further includes a straining edge 40 of the peripheral wall 25 that is proximate a periphery 50 of the open end 28 and includes a plurality of apertures 60 traversing therethrough.

Figure 6:
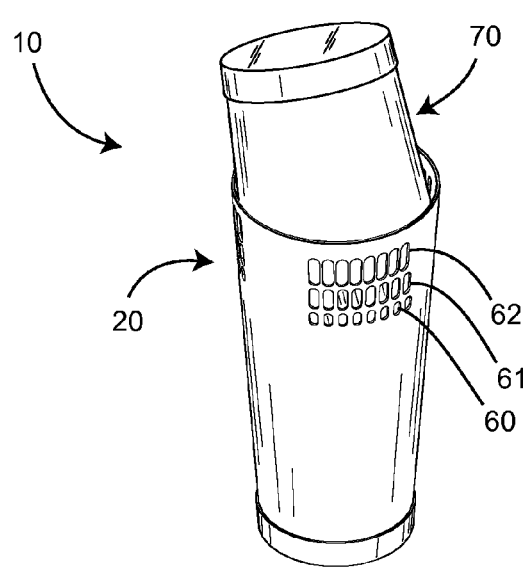
FIG. 6 is a perspective view of yet another alternate embodiment of the first container, cooperating with the second container to expose only certain apertures of the first container.
Figure 7:
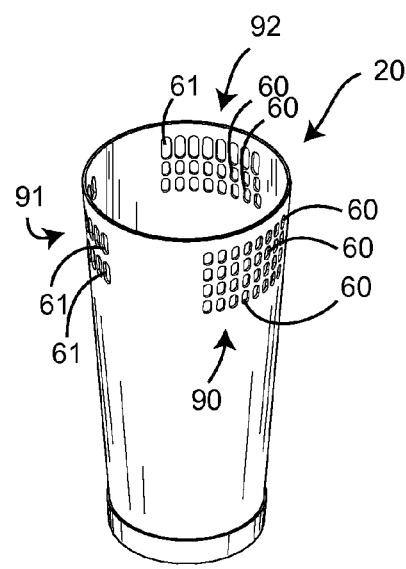
FIG. 7 is a perspective view of yet another alternate embodiment of the first container.
Figure 8:
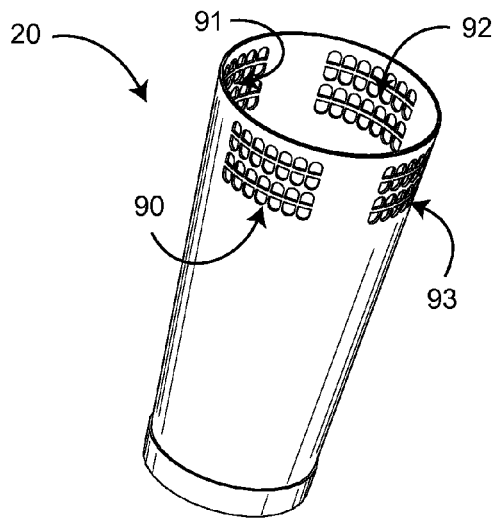
FIG. 8 is a perspective view of a first container having exactly four groups of apertures.
Figure 9:
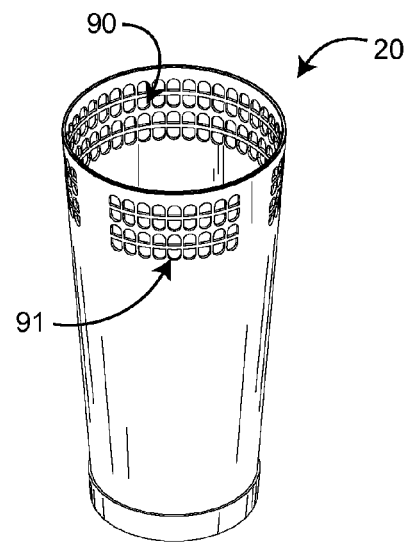
FIG. 9 is a perspective view of an embodiment of the first container having two disparate groups of apertures.
Figure 10:
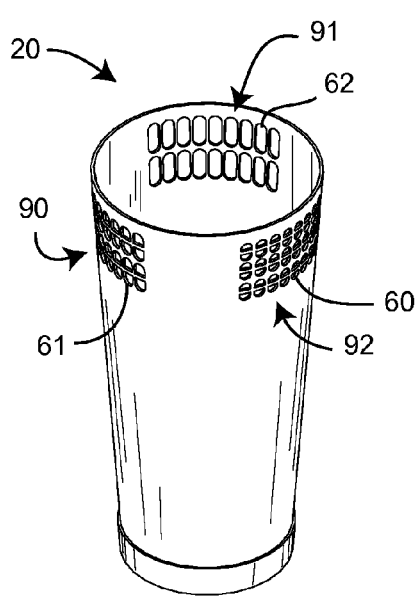
FIG. 10 is a perspective view of yet another embodiment of the first container.
Figure 11:
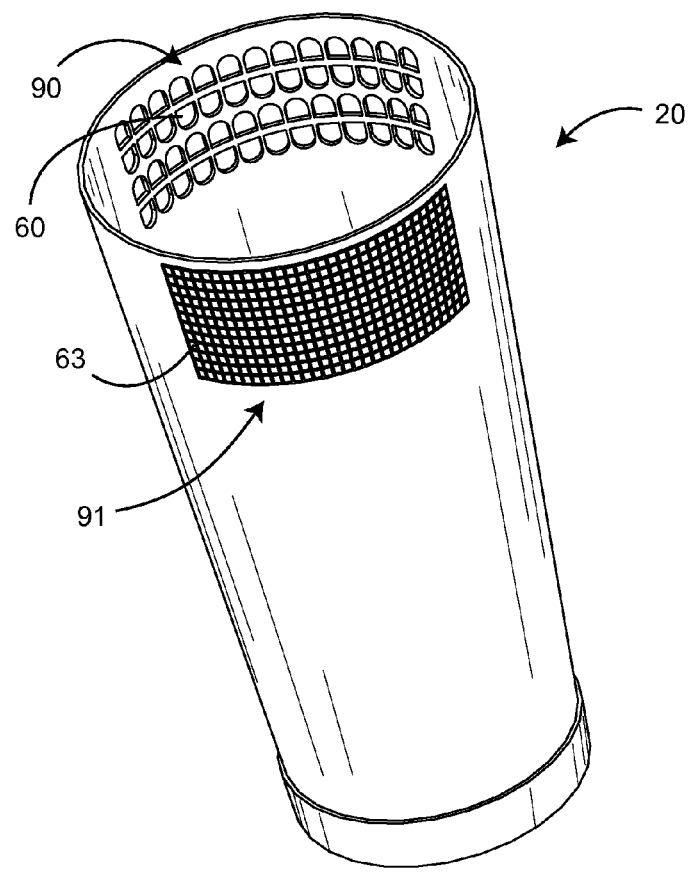
FIG. 11 is a perspective view of an embodiment of the first container having a screen mesh portion having relatively small apertures.

In some embodiments, the plurality of apertures 60 comprise apertures 61,62 of at least two different sizes (FIGS. 5-7), suitable for mixing and pouring of different types of beverages. For example, apertures 60 may be suitable in size for straining fruit pulp (not shown), while larger apertures 61 allow such pulp to pass through.

Figure 5:
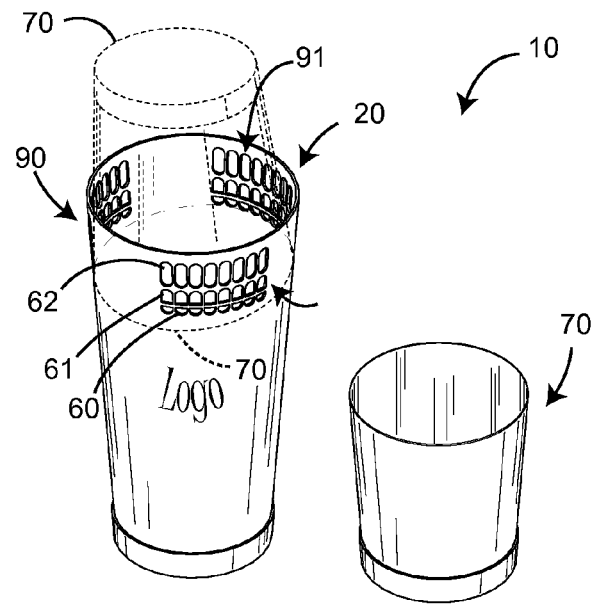
FIG. 5 is a perspective view of another alternate embodiment of the first container, cooperating with the second container, in phantom outline for clarity of illustration, to completely seal internal spaces of each container.

Some embodiments may include apertures 60 that are segregated into at least two apertures groups 90,91,92,93 (FIGS. 2-11) separated by an area of the straining edge 40 devoid of apertures 60. In such an embodiment, the apertures 60 in a first group 90 may be smaller than the apertures 61 in a second group 91 (FIG. 7), for example. Three such groups 90,91,92 may be included, for example, on the straining edge 40 of the first container 20 (FIG. 5). In one embodiment, each group 90,91,92 spanning an arc of 60 degrees and separated by an arch of the straining edge 40 being devoid of apertures 60 and spanning an arc of 60 degrees, for example. Group 90, in such an embodiment, may include the smallest apertures 60, while group 91 includes medium-sized apertures 61, and group 92 includes the largest apertures 62, for instance. Alternately, a first group 90 may include the smallest apertures 60, while group 91 includes the largest apertures 62, and group 92 includes a mix of the smallest and largest apertures 60,62. In one embodiment, a screen material 63 is used to form the apertures 60, these being relatively 90, such as three or four groups, and apertures 60 sizes may also be formed in the straining edge 40 of the first container 10.

A second container 70 has a closed end 72, an open end 78, and a peripheral wall 75 that extends from the closed end 72 to the open end 78 and defines an interior space 80 therein. The area $A_{o2}$ of the open end 78 is greater than the area $A_{C2}$ of the closed end 72, but smaller than the area $A_{o1}$ of the open end 28 of the first container 20. In one embodiment, the height of the second container 70 may be approximately the same as the height of the first container 20, or it may be shorter (FIGS. 1, 5). Such a second container 70 is preferably made from a stainless steel material, or other suitably rigid, durable, and washable material, preferably of the same type of material as the first container 20. A logo may be applied to the first or second containers 20,70, if desired.

As such, the open end of 78 of the second container 70 may be inserted fully into the open end 28 of the first container 20 such that the peripheral wall 75 of the second container 70 contacts the peripheral wall 25 of the first container 20 below the straining edge 40 so that the internal spaces 70,80 of each container 20,70 are sealed. When the open end 78 of the second container 70 is partially pulled away from the first container 20 such that the periphery 50 of the open end 28 of the first container 20 at least partially exposes the straining edge 40 of the first container 20, the internal spaces 70,80 of each container 20,70 are unsealed at the plurality of apertures 60.

While a particular form of the invention has been illustrated and described, it will be apparent that various modifications can be made without departing from the spirit and scope of the invention. For example, apertures 60 of varying shapes may be utilized. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A combination beverage mixer and strainer, comprising:
a first container having a closed end, an open end, a peripheral wall extending from the closed end to the open end and defining an interior space therein, the area of the open end being greater than the area of the closed end, a straining edge of the peripheral wall being defined proximate the periphery of the open end and including a plurality of apertures traversing therethrough; and
a second container having a closed end, an open end, and a peripheral wall extending from the closed end to the open end and defining an interior space therein, the area of the open end being greater than the area of the closed end but smaller than the area of the open end of the first container, the second container further including a second straining edge in the peripheral wall thereof, the second straining edge being defined proximate the periphery of the open end and including a plurality of apertures traversing therethrough;
wherein the open end of the second container may be inserted fully into the open end of the first container such that the peripheral wall of the second container contacts the peripheral wall of the first container below the straining edge so that the internal spaces of each container are sealed, and wherein the open end of the second container may be partially pulled away from the first container at least partially into the straining edge of the first container, such that the internal spaces of each container are unsealed at the plurality of apertures.

2. The combination of claim 1 where the plurality of apertures comprise apertures of at least two different sizes.

3. The combination of claim 1 wherein the plurality of apertures are segregated into at least two aperture groups separated by an area of the straining edge devoid of apertures.

4. The combination of claim 3 wherein at least one aperture group is comprised of apertures smaller than those of a second aperture group.

5. The combination of claim 3 wherein the at least two aperture groups are exactly three aperture groups.

6. The combination of claim 5 wherein each of the three aperture groups span an arc of approximately 60 degrees, and wherein each area of the straining edge devoid of apertures also span an arc of approximately 60 degrees.

7. The combination of claim 5 wherein the three aperture groups are comprised of smallest, medium, and largest apertures, respectively.

8. The combination of claim 5 wherein one aperture group is comprised of smallest apertures, a second aperture group is comprised of largest apertures, and the third aperture group is comprised of a mix of the smallest and largest apertures.

9. The combination of claim 3 wherein the at least two aperture groups are exactly four groups.

10. The combination of claim 1 wherein each container is formed from a metallic material.

11. The combination of claim 1 wherein each container is formed from stainless steel.

12. The combination of claim 1 wherein each container is formed from at least one plastic material.

13. The combination of claim 1 wherein each container is formed from silver.

14. The combination of claim 1 wherein each container is integrally formed.

15. The combination of claim 1 wherein the apertures of the second straining edge are of a different size than the apertures of the straining edge of the first container.

* * * * *